(12) United States Patent
Choi

(10) Patent No.: US 11,219,196 B2
(45) Date of Patent: Jan. 11, 2022

(54) LURE

(71) Applicant: DUEL CO., INC., Fukuoka (JP)

(72) Inventor: Eric Eun-Ha Choi, Fukuoka (JP)

(73) Assignee: DUEL CO., INC., Fukuoka (JP)

( * ) Notice: Subject to any disclaimer, the term of this patent is extended or adjusted under 35 U.S.C. 154(b) by 356 days.

(21) Appl. No.: 16/482,862

(22) PCT Filed: Jan. 31, 2018

(86) PCT No.: PCT/JP2018/003071
§ 371 (c)(1),
(2) Date: Aug. 1, 2019

(87) PCT Pub. No.: WO2018/155108
PCT Pub. Date: Aug. 30, 2018

(65) Prior Publication Data
US 2019/0343102 A1    Nov. 14, 2019

(30) Foreign Application Priority Data

Feb. 21, 2017 (JP) .............................. JP2017-030441

(51) Int. Cl.
*A01K 85/10* (2006.01)
*A01K 85/18* (2006.01)

(52) U.S. Cl.
CPC .............. *A01K 85/10* (2013.01); *A01K 85/18* (2013.01)

(58) Field of Classification Search
CPC ......... A01K 85/10; A01K 85/18; A01K 85/14
USPC ........................................................ 43/42.5
See application file for complete search history.

(56) References Cited

U.S. PATENT DOCUMENTS

| | | | | |
|---|---|---|---|---|
| 2,576,795 A | * | 11/1951 | Lane ...................... | A01K 85/02 43/42.32 |
| 2,913,848 A | * | 11/1959 | Hildebrandt ........... | A01K 85/14 43/42.16 |
| 3,724,117 A | * | 4/1973 | Flanagan, Jr. ......... | A01K 85/14 43/42.24 |
| D299,944 S | * | 2/1989 | Haavig ....................... | D22/126 |

(Continued)

FOREIGN PATENT DOCUMENTS

| | | | | |
|---|---|---|---|---|
| DE | 3024383 A1 | * | 1/1982 | ............ A01K 85/10 |
| FR | 2427786 A1 | * | 1/1980 | ............ A01K 85/16 |

(Continued)

OTHER PUBLICATIONS

International Search Report dated May 1, 2018, issued in counterpart International Application No. PCT/JP2018/003071, with English Translation (3 pages).

*Primary Examiner* — Christopher P Ellis
(74) *Attorney, Agent, or Firm* — Westerman, Hattori, Daniels & Adrian, LLP

(57) ABSTRACT

A lure 10 includes the arm member 1 and the charm member 3. The arm member 1 includes a first arm part 11 having an elongated shape and a second arm part 12 connected to an end part of the first arm part 11 and extending in a direction not parallel to the first arm part 11. The charm member 3 is connected to the first arm part 11 via the connecting part 5. The charm member 3 is connected to the first arm part 11 to be rotatable around an axial center R1 connecting the connecting part and a center of the charm member 3 and to allow a rotation amount of the charm member to be regulated within a predetermined range.

15 Claims, 16 Drawing Sheets

(56) References Cited

U.S. PATENT DOCUMENTS

| | | | | |
|---|---|---|---|---|
| 5,461,819 A * | 10/1995 | Shindiedecker | A01K 85/14 | 43/42.11 |
| 8,042,298 B1 * | 10/2011 | Yonekura | A01K 85/10 | 43/42.51 |
| 9,072,285 B1 * | 7/2015 | Rye | A01K 85/00 | |
| 9,179,655 B1 * | 11/2015 | Love | A01K 85/01 | |
| 2002/0148155 A1 * | 10/2002 | Pasley | A01K 85/14 | 43/42.49 |
| 2008/0263935 A1 * | 10/2008 | Albrecht | A01K 85/10 | 43/42.13 |
| 2010/0281756 A1 * | 11/2010 | Lau | A01K 85/00 | 43/42.13 |
| 2011/0247260 A1 * | 10/2011 | Schwartz | A01K 85/00 | 43/42.31 |
| 2015/0128477 A1 * | 5/2015 | Heesch | A01K 85/10 | 43/42.02 |
| 2015/0373962 A1 * | 12/2015 | Boyer | A01K 91/06 | 43/43.1 |
| 2016/0183504 A1 * | 6/2016 | Curtis | A01K 85/10 | 43/4.5 |
| 2016/0242399 A1 * | 8/2016 | McClelland | A01K 85/10 | |
| 2017/0042134 A1 * | 2/2017 | Sandefur | A01K 85/10 | |
| 2017/0099822 A1 * | 4/2017 | Thorne | A01K 85/00 | |
| 2017/0181416 A1 * | 6/2017 | Hunter | A01K 85/00 | |
| 2017/0347635 A1 * | 12/2017 | Sandefur | A01K 85/02 | |
| 2018/0310538 A1 * | 11/2018 | Supinski | A01K 85/01 | |
| 2019/0166813 A1 * | 6/2019 | VanZant | A01K 85/10 | |
| 2020/0060248 A1 * | 2/2020 | Choate | A01K 85/10 | |

FOREIGN PATENT DOCUMENTS

| | | | | |
|---|---|---|---|---|
| FR | 2602397 A1 * | 2/1988 | A01K 85/10 |
| JP | 2003-259765 A | 9/2003 | |
| JP | 2004-49125 A | 2/2004 | |
| JP | 2005-185216 A | 7/2005 | |
| JP | 2009-100685 A | 5/2009 | |
| JP | 4820926 B1 * | 9/2011 | |

* cited by examiner

LURE

TECHNICAL FIELD

The present invention relates to a lure capable of effectively attracting fish to be caught by fishing (target fish).

BACKGROUND ART

A lure called a spinner bait as described in Patent Literature 1 has been conventionally used.

As illustrated in FIG. 20A, a conventional spinner bait 10A includes an arm member 1A having an elongated shape bended into a substantially V shape when viewed from a side, a lure body 2A provided on one end of the arm member 1A and having a fish hook, and a blade 6A provided on the other end of the arm member 1A. As illustrated in FIG. 20B, the blade 6A has a spoon-like shape in which a central region is dented.

In the conventional spinner bait 10A, the blade 6A is connected to the arm member 1A via a swivel 7A. Thus, when the spinner bait 10A swims, the blade 6A catches a stream of water and continuously rotates around a travelling direction of the spinner bait 10A. Vibrations produced by the rotation of the blade 6A are propagated to the lure body 2A through the arm member 1A, thereby vibrating the lure body 2A. Further, the rotation of the blade 6A makes sunlight hitting the blade 6A diffused.

As described above, with the vibrations of the lure body 2A and the diffused sunlight caused by the rotation of the blade 6A, the spinner bait 10A has an appearance like a school of small fish, which thus allows the spinner bait 10A to attract the target fish effectively.

Patent Literature 1: JP 2005-185216 A

SUMMARY OF INVENTION

Technical Problem

However, when the conventional spinner bait 10A is used over a long period of time, the target fish finds out that the spinner bait 10A is not a real bait, which leads to a gradual decrease in a catch.

An object of the present invention is to provide a lure capable of effectively attracting the target fish and achieving a great catch even if the lure is used over a long period of time.

Solution to Problem

The present inventor conducted a research on causes of a decrease in a catch when the conventional spinner bait 10A is used over a long period of time, and found that the rotation of the blade 6A is one of the causes.

That is, although an actual school of small fish moves randomly, the blade 6A rotates regularly and continuously in one direction in the conventional spinner bait 10A while swimming. Thus, vibrations of the lure body 2A and sunlight reflection caused by the rotation of the blade 6A are likely to become monotony. Accordingly, it is considered that the target fish easily finds out that the spinner bait 10A is not an real bait, which consequently leads to a gradual decrease in the catch.

Based on the above finding, the present inventor thought that a lure having an appearance like a randomly moving school of small fish achieves an effective catch over a long period of time, and therefore made the present invention.

A lure includes an arm member including a first arm part having an elongated shape, and a second arm part connected to an end part of the first arm part and extending in a direction not parallel to the first arm part, and a charm member connected to the first arm part via a connecting part, wherein the charm member is substantially spherical, and the charm member is connected to the first arm part to be rotatable around an axial center connecting the connecting part and a center of the charm member and to allow a rotation amount of the charm member to be regulated within a predetermined range.

In a preferable lure of the present invention, the connecting part includes a first annular part provided to the first arm part and a second annular part provided to the charm member, and the first annular part and the second annular part are connected to each other in a state where the second annular part is inserted through a hole of the first annular part.

Preferably, the connecting part includes a first annular part provided to the first arm part, a second annular part provided to the charm member, and at least one ring member, and the first annular part and the ring member are connected to each other in a state where the ring member is inserted through a hole of the first annular part and the second annular part and the ring member are connected to each other in a state where the ring member is inserted through a hole of the second annular part.

In a preferable lure of the present invention, a cutout surface is formed on a part of the charm member.

Preferably, the cutout surface is a plane substantially orthogonal to an axial center of the charm member.

Preferably, a percentage of a surface area of the cutout surface with respect to a surface area of the charm member is 5% to 20%.

Preferably, a density of the charm member is less than 1.0 g/cm$^3$.

Preferably, a hollow having a polyhedral structure is formed inside the charm member.

Advantageous Effects of Invention

In the lure of the present invention, the charm member having a substantially spherical shape is connected to the first arm part to be rotatable around an axial center connecting the connecting part and a center of the charm member and to allow a rotation amount of the charm member to be regulated within a predetermined range. Thus, the lure of the present invention has an appearance like a randomly moving school of small fish. For that reason, it is difficult for target fish to find out that the lure of the present invention is not an real bait. Therefore, using the lure of the present invention, a great catch can be expected over a long period of time.

DESCRIPTION OF EMBODIMENTS

Hereinafter, a lure according to a first embodiment of the present invention will be described with reference to FIGS. 1 to 11, and then lures according to second to ninth embodiments will be described in a sequential order. The lures according to the second to ninth embodiments will be described by pointing to differences from a lure that will have already described and by appropriately eliminating the description of common features and operations and effects. Note that a dimension such as a thickness and a size of each figure is different from an actual dimension.

In this specification, a numerical range of "lower limit X to upper limit Y" means the lower limit of X or more and the upper limit of Y or less. In the case where a plurality of numerical ranges is described, any lower limit and any upper limit may be selected to set a numerical range of "any lower limit to any upper limit".

In this specification, a direction in which the lure swims forward when a fishing line connected to an arm member is pulled underwater is referred to as a "front direction", a direction opposite to the front direction is referred to as a "back direction", and both directions are generically referred to as a "front and back direction", in some cases. In this specification, an "upper direction" refers to a direction orthogonal to the front and back direction and is a direction toward a surface of the water based on the lure while swimming, and a "lower direction" refers to a direction opposite to the upper direction, that is, a direction toward a bottom of the water based on the lure while swimming. The upper direction and the lower direction are generically referred to as an "upper and lower direction" in some cases. Further, in this specification, a direction orthogonal to the upper and lower direction and the front and back direction is referred to as a "left and right direction" in some cases.

Figure 1:
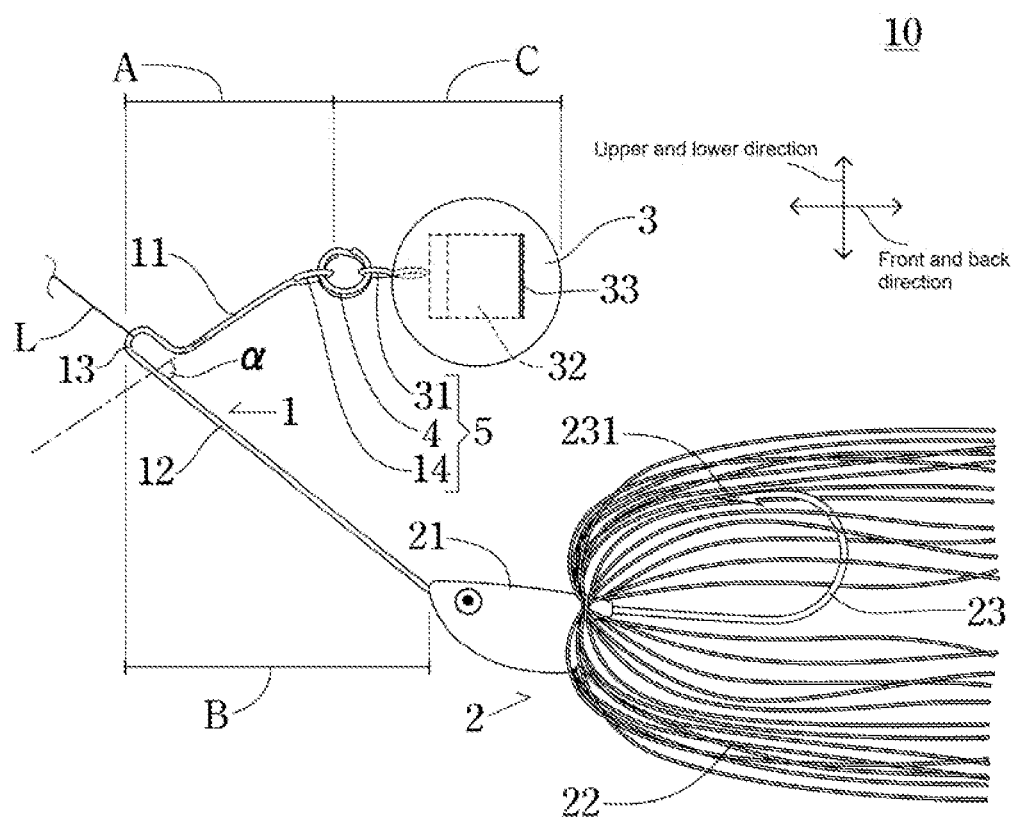
FIG. 1 is a side view of a lure according to a first embodiment of the present invention.
Figure 2:
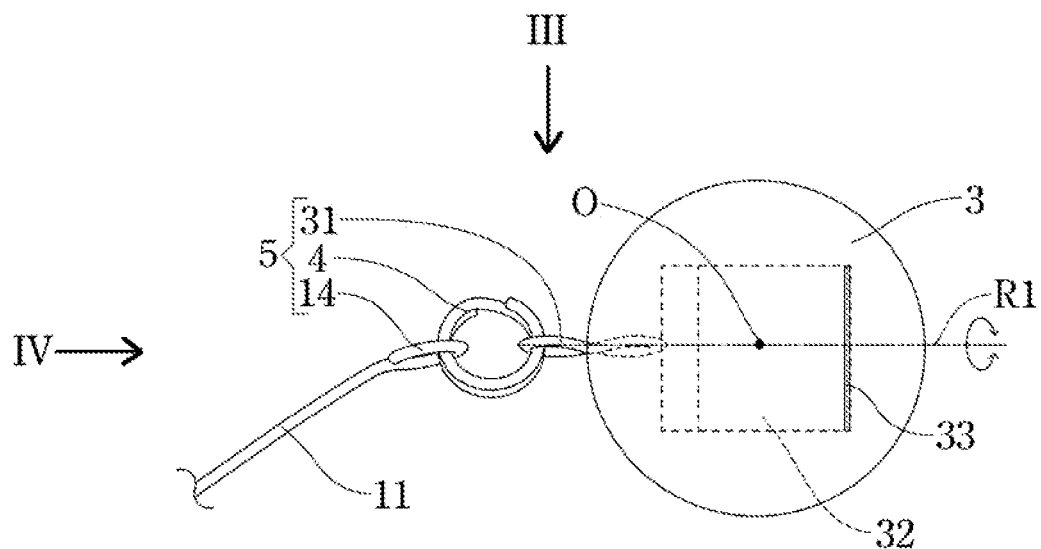
FIG. 2 is a partially enlarged side view of a charm member and its surrounding members of the lure according to the first embodiment.
Figure 3:
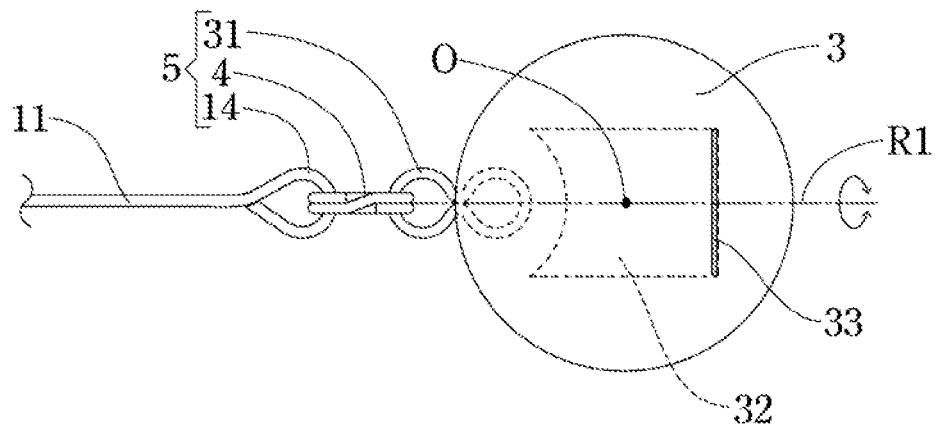
FIG. 3 is a top view of FIG. 2 when viewed from a direction of an arrow III.
Figure 4:
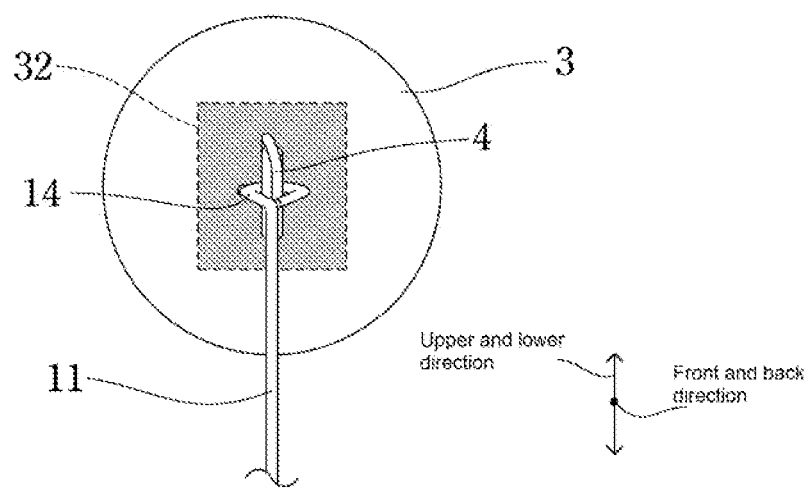
FIG. 4 is a front view of FIG. 2 when viewed from a direction of an arrow IV.

When a side view of a lure 10 in FIG. 1 is taken as an example, the left side of the paper corresponds to the "front direction (travelling direction of the lure 10)", the right side of the paper corresponds to the "back direction", the upper side of the paper corresponds to the "upper direction", and the lower side of the paper corresponds to the "lower direction".

First Embodiment

As illustrated in FIG. 1, a lure 10 of the present invention includes at least an arm member 1 and a charm member 3. The arm member 1 includes a first arm part 11 having an elongated shape and a second arm part 12 connected to an end of the first arm part 11. The second arm part 12 extends in a direction not parallel to the first arm part 11. The charm member 3 is connected to the first arm part 11 via a connecting part 5.

In this embodiment, as illustrated in FIG. 1, the first arm part 11 is positioned above the second arm part 12, and the second arm part 12 is provided on a lure body 2.

Hereinafter, main members constituting the lure 10 according to this embodiment will be described.
<Lure Body>

A lure body 2 is a member which is bitten by target fish when the lure 10 of the present invention is used. In this embodiment, as illustrated in FIG. 1, the lure body 2 includes a main part 21, a skirt 22, and a fish hook 23. These parts interact with each other, so that the lure body 2 has an appearance like a real bait.

The main part 21 is a core part of the lure body 2. The main part 21 is stationarily attached (fixed) to an end of the second arm part 12. A shape of the main part 21 is not limited to a particular shape, and may be a shape imitating a whole or a part of a real bait which is bitten by the target fish or a shape having no relation to a real bait. However, the main part 21 preferably has a shape imitating a whole or a part of a real bait to improve a catch. When the shape imitating a part of a real bait is used, a part to be imitated is not limited to a particular part, and may be appropriately changed according to kinds of the target fish. However, a shape imitating the head of a real bait is preferable. Use of the shape imitating the head easily misleads the target fish into recognizing the main part 21 as a real bait. In this embodiment, as illustrated in FIG. 1, the main part 21 has a shape imitating the head of small fish.

Further, the main part 21 may be colored to attract an interest of the target fish. This coloring may be done by imitating parts (eyes, gills, scales, and the like) of a real bait or by painting patterns having no relation to the real bait. In this embodiment, the main part 21 has a pattern imitating eyes of the real bait to reproduce the head of small fish.

A formation material of the main part 21 is not limited to a particular material, and a material having mechanical strength enough to withstand even if the target fish bites the main part 21 is used. Examples of such a material include a metal and a resin, and the metal is preferably used. Examples of the metal used as the formation material of the main part 21 include iron, lead, tungsten, aluminum, and an alloy of these metals.

In this embodiment, the skirt 22 and the fish hook 23 are each connected to the main part 21. Specifically, a base of the fish hook 23 and a base of the skirt 22 are each fixed to a part of the main part 21 (a rear end of the main part 21, for example).

The skirt 22 is, for example, an aggregate of a bunch of flexible string-like members and is provided to cover the fish hook 23. As the skirt 22 sways underwater, the lure 10 is easily found by the target fish. Further, the fish hook 23 is hidden by the skirt 22, which easily misleads the target fish into recognizing the lure body 2 as a real bait. A formation material of the skirt 22 is not limited to a particular material, and an example thereof includes a polymeric material such as a soft synthetic resin and a rubber. Examples of the soft synthetic resin include an elastomeric resin, a silicone resin, an acrylic resin, and a urethane resin. A length of the skirt 22 is not limited to a particular length, and is preferably a length that is longer than a length of the fish hook 23 to hide the fish hook 23. Specifically, the skirt 22 preferably has a length that is 1.2 times to 3 times longer than the length of the fish hook 23.

When the lure 10 swims underwater, the skirt 22 is affected by a stream of water and a swaying motion of a charm member 3 as described below and thus sways up and down and left and right in the rear side of the main part 21. The fish hook 23 is provided so that the fish hook 23 is hidden by this skirt 22, and extends rearward from the rear side of the main part 21 in this embodiment.

A shape of the fish hook 23 is not limited to a particular shape. For example, the fish hook 23 having one or more hooks can be used. However, the more hooks, the more likely that string-like members constituting the skirt 22 get caught on the fish hook 23 and consequently the skirt 22 may be damaged in a short period of time. For that reason, the fish hook 23 having one to three hooks is preferably used and the fish hook 23 having one hook (which is generally called a single hook) as illustrated in FIG. 1 is more preferably used. A position of a point of hook 231 (needle point) is not limited to a particular position. However, by positioning the point of hook 231 above the main part 21 as illustrated in FIG. 1, the fish hook 23 is more likely to get stuck in the mouth of the target fish.

The point of hook 231 of the fish hook 23 is preferably positioned in the back of the rear end of the charm member 3 so that a bite by the target fish with respect to the lure body 2 is not interrupted by the charm member 3.

As described above, in this embodiment, the lure body 2 includes the main part 21, the skirt 22, and the fish hook 23. However, the lure body 2 may not include the main part 21 and/or the skirt 22 under conditions that the lure body 2 includes the fish hook 23. To improve a catch, the lure body 2 preferably includes the main part 21 and the skirt 22 as in this embodiment.

Further, the lure body 2 is fixed to the second arm part 12 as described above. However, the lure body 2 may be detachably connected to the second arm part 12. If the lure body 2 is detachable, the lure body 2 can be changed according to the target fish, which leads to a further improvement in the catch.

<Arm Member>

An arm member 1 is a wire rod connecting the lure body 2 as described above and the charm member 3 as described below and also is a wire rod to which a fishing line L is connected.

The arm member 1 includes a first arm part 11 having an elongated shape, a second arm part 12 connected to an end of the first arm part 11 and extends in a direction not parallel to the first arm part 11, and a third arm part 13 provided on the border between the first arm part 11 and the second arm part 12. In this embodiment, as illustrated in FIG. 1, an end of the first arm part 11 and an end of the second arm part 12 are connected to each other via the third arm part 13 having a U shape, and the third arm part 13 is formed so that a bottom of the U shape is positioned in a front end of the arm member 1. The fishing line L is tied to the third arm part 13.

The charm member 3 as described below is connected to the first arm part 11 of the arm member 1, and the lure body 2 as described below is connected to the second arm part 12.

The charm member 3 may be connected to any position between a front end and a rear end of the first arm part 11 as illustrated in FIG. 1. Similarly to the above, the lure body 2 can be connected to any position between a front end and a rear end of the second arm part 12.

To make the charm member 3 sway effectively, the charm member 3 is preferably connected to the rear end of the first arm part 11. Further, to make the target fish easily bite the lure body 2, the lure body 2 is preferably connected to the rear end of the second arm part 12 as illustrated in FIG. 1.

A formation material of the arm member 1 is not limited to a particular material. For example, iron, stainless steel, a shape-memory alloy such as a Ti (titanium)-Ni (nickel) alloy, and other alloys can be used.

The arm member 1 does not only connect the lure body 2 and the charm member 3, but also has a function to propagate random vibrations produced by the swaying motion of the charm member 3. As the lure body 2 vibrates with the random vibrations produced by the charm member 3, the lure body 2 moves more like a real bait. As a result, the target fish is more likely to bite the lure body 2. Given the above, the formation material of the arm member 1 is preferably a material that easily propagates vibrations of the charm member 3. Specifically, it is preferably iron, stainless steel, or a shape-memory alloy, more preferably stainless steel or a shape-memory alloy.

A cross-sectional shape of the arm member 1 is not limited to a particular shape, and is usually has a substantially circular or substantially polygonal shape. A wire diameter of the arm member 1 is not limited to a particular diameter. However, considering propagation efficiency of the above-described vibrations and practical mechanical strength in lure fishing, the wire diameter is preferably 0.8 mm to 3 mm, more preferably 1 mm to 2 mm.

When the lure 10 is viewed from a side as illustrated in FIG. 1, a ratio (A/B) of a width A from the front end of the arm member 1 (front end of the third arm part 13) to a rear end of the first annular part 14 and a width B from the front end of the arm member 1 to the rear end of the second arm part 12 is not limited to a particular ratio. However, a lower limit of the ratio is usually 0.2, preferably 0.3, more preferably 0.4, further preferably 0.5. An upper limit of the ratio is usually 1.2, preferably 1.1, further preferably 1.0.

When the ratio (A/B) is within the above range, the lure body 2 and the charm member 3 in the front and back direction have an appropriate space in between, which thus makes the lure 10 look more like a school of small fish.

An angle of the second arm part 12 with respect to the first arm part 11 is not limited to a particular angle, and is preferably 5° to 90°, more preferably 10° to 90°, further preferably 30° to 90°. As illustrated in FIG. 1, the angle refers to an internal angle α formed by an imaginary extension line of the first arm part 11 (this imaginary extension line is indicated by a dot-and-dash line) and the second arm part 12.

When the angle of the second arm part 12 with respect to the first arm part 11 is within the above range, the lure body 2 and the charm member 3 in the upper and lower direction have an appropriate space in between, which thus makes the lure 10 look more like a school of small fish.

<Charm Member>

The charm member 3 randomly sways up and down and left and right when the lure 10 swims underwater. As the charm member 3 sways up and down and left and right randomly, the lure body 2 also sways up and down and left and right randomly along with the charm member 3. Accordingly, as the lure 10 looks like a randomly moving school of small fish, a great catch can be expected over a long period of time.

The present inventor considered that reproducing an appearance of a randomly moving school of small fish is important to mislead the target fish into recognizing the lure as a real bait, and conducted an extensive research on a member capable of swaying randomly. As a result, the present inventor focused attention on a knuckle ball which is one of the breaking balls used in baseball.

The knuckle ball is a breaking ball that is thrown by reducing spins on a baseball as much as possible and falls as the ball sways up and down and left and right randomly on the way from a pitcher to a catcher. One of the causes that makes the knuckle ball sway randomly as described above is that a turbulent flow of air called a Karman's vortex street is generated behind the ball due to the reduction of spins on the ball.

The present inventor assumed that since the knuckle ball sways randomly in the air, a lure sways randomly underwater if a substantially spherical member on which the spins are reduced is connected to the lure because the water and the air are common in that they are both fluid. As a result of trial and error, the present inventor achieved the present invention.

As illustrated in FIGS. 1 to 5, the charm member 3 of the present invention is a substantially spherical and connected to the first arm part 11 of the arm member 1 as described above via the connecting part 5.

In this case, a substantially sphere includes a shape that is recognized as an approximately sphere, and includes a perfect sphere, and also an oval sphere and an indefinite shape of these shapes. Examples of the indefinite shape of the perfect sphere and the oval sphere include a partially dented perfect sphere or oval sphere, a perfect sphere or oval sphere in which a plane is partially provided, and a polyhedral sphere composed of a plurality of planes.

In this embodiment, the charm member 3 having a substantially perfect spherical shape is connected to the first arm part 11 via the connecting part 5 including a first annular part 14, a second annular part 31, and a ring member 4.

Specifically, the first annular part 14 is a member having an annular structure formed in the rear end of the first arm part 11. The first annular part 14 is fixed to the rear end of the first arm part 11 by, for example, bending an end of a wire rod constituting the first arm part 11 into a circle. The second annular part 31 is a member having an annular structure that is provided so as to extend forward from a front end of the charm member 3. In this embodiment, the second annular part 31 has two annular structures formed by bending a separate wire rod from the charm member 3 into an 8 shape, and is fixed to the front end of the charm member 3 by implanting only one of the two annular structures in the front end of the charm member 3.

The first annular part 14 and the second annular part 31 are connected to each other via the ring member 4. Specifically, the first annular part 14 and the ring member 4 are connected to each other in a state where the ring member 4 is inserted through a hole of the first annular part 14, and the second annular part 31 and the ring member 4 are connected to each other in a state where the ring member 4 is inserted through a hole of the second annular part 31. To be brief, the first annular part 14 and the second annular part 31 are chain-like connected to each other via the ring member 4.

The ring member 4 is not limited to a particular ring, and a so-called split ring is preferably used as it has a good balance between ease of handling and strength. The split ring is a member formed by winding one wire rod multiple times in a coil, and a split ring formed by winding one wire rod twice in a coil is used in this embodiment. As the ring member 4, a split ring formed by winding one wire rod three or more times can be used (not illustrated). Using a split ring as the ring member 4 allows the first annular part 14 and the second annular part 31 to be chain-like connected to each other in a simple manner.

In this embodiment, the charm member 3 is connected to the arm member 1 via the chain-like connecting part 5 (the first annular part 14, the second annular part 31, and the ring member 4). Thus, the charm member 3 is rotatable around an axial center R1 connecting the connecting part 5 and a center O of the charm member 3, and a rotation amount of the charm member 3 is regulated within a predetermined range. In this embodiment, the connecting part 5 includes the first annular part 14, the second annular part 31, and the ring member 4, and a part to which the center O of the charm member 3 is connected when defining the axial center R1 is a front end of the second annular part 31.

Figure 6:
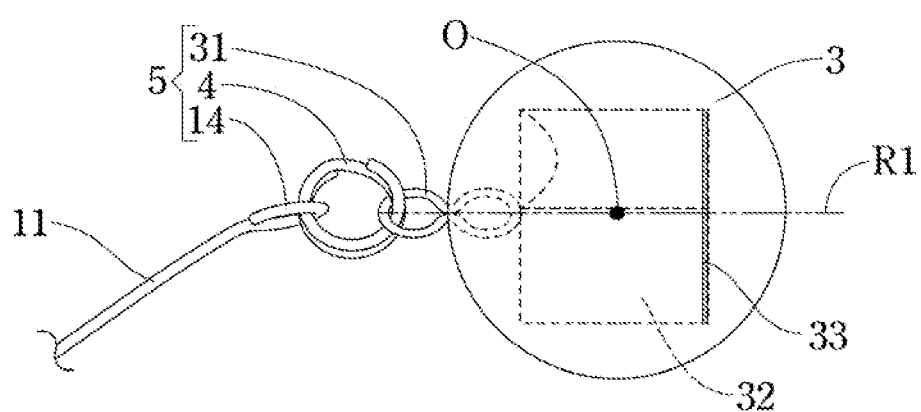
FIG. 6 is a partially enlarged side view of the charm member in a state where the charm member is rotated.

In this embodiment, the charm member 3 is rotatable around the axial center R1. As the charm member 3 rotates, the second annular part 31 also rotates around the axial center R1. However, the ring member 4 is not fixed to the charm member 3 and thus does not rotate along with the rotation of the charm member 3. Accordingly, when the charm member 3 rotates, the second annular part 31 and the ring member 4 interfere with each other as illustrated in FIG. 6, and the rotation amount of the charm member 3 is thus regulated within a predetermined range.

Figure 7A:
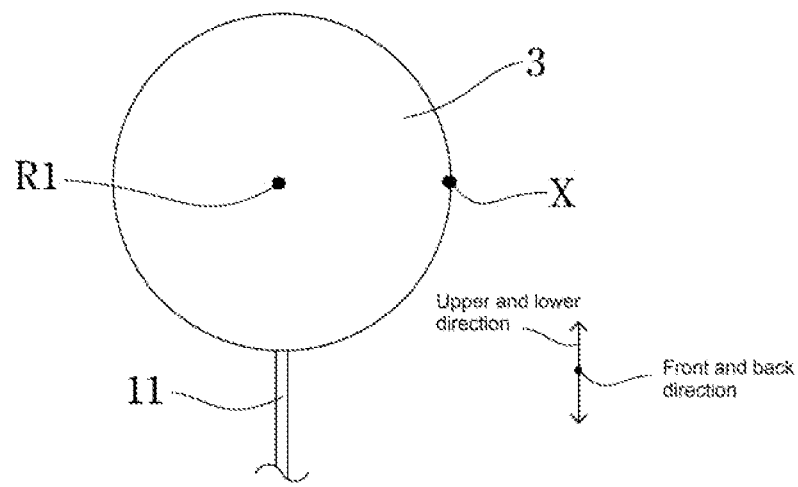
FIG. 7A is a referential rear view of the charm member illustrating a reference point X.
Figure 7B:
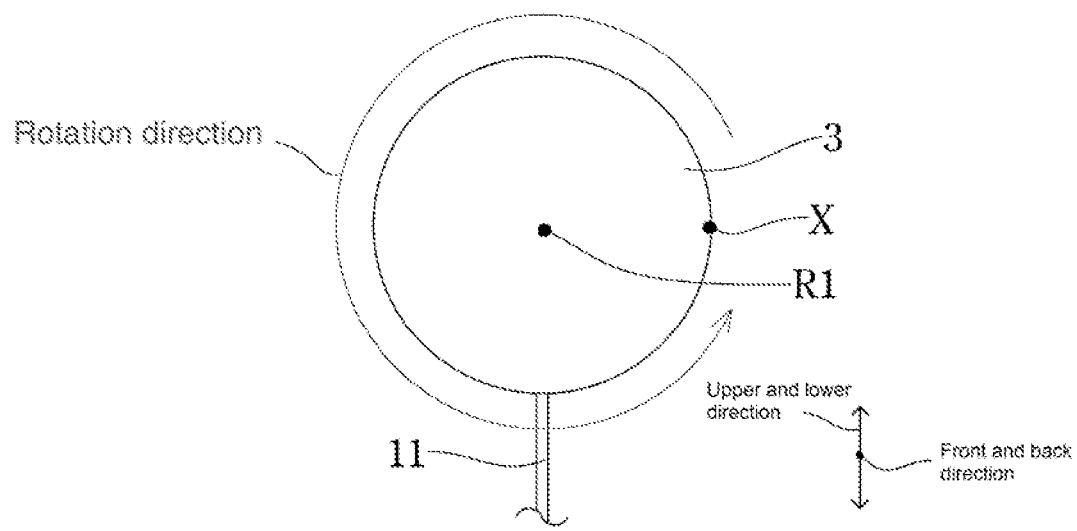
FIG. 7B is a referential rear view of the charm member in a state where the charm member in FIG. 7A has been rotated once around an axial center R1.

Specifically, "the rotation amount of the charm member 3 is regulated within a predetermined range" means that the charm member 3 only rotates less than one turn around the axial center R1. One turn of the charm member 3 means that when any point on a periphery of the charm member 3 is defined as a reference point X as illustrated in FIG. 7A and the charm member 3 rotates around the axial center R1 as illustrated in FIG. 7B, the reference point X comes back to the same position after rotating 360° (comes back to the same state as in FIG. 7A). That is, "the charm member 3 rotates less than one turn only" means that the reference point X does not rotate 360° around the axial center R1 (the reference point X does not come back to the same position after rotating).

Although the charm member 3 when viewed from the back rotates counterclockwise for descriptive purposes in FIG. 7B, the same can be said for a case where the charm member 3 rotates clockwise. The reference point X is determined when the charm member 3 is in a neutral state (a state where the charm member 3 has not yet rotated clockwise or counterclockwise, that is, a state where the charm member 3 can rotate clockwise to the same extent as rotating counterclockwise).

In this embodiment, the charm member 3 can rotate not only around the axial center R1 but also around a different axial center. However, even if the charm member 3 rotates around the different axial center, the charm member 3 rotates less than one turn.

Figure 8A:
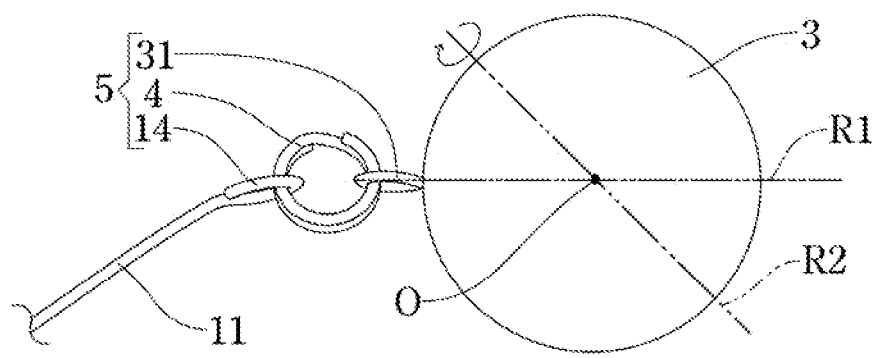
FIG. 8A is a partially enlarged side view of the lure according to the first embodiment illustrating an axial center R2.
Figure 8B:
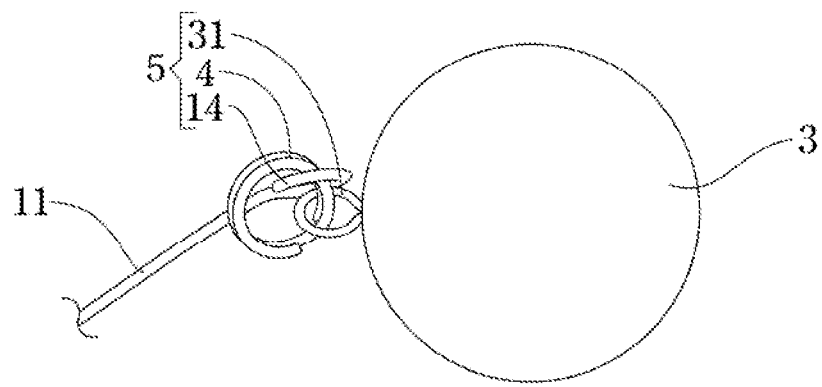
FIG. 8B is a partially enlarged side view of the aforementioned lure in a state where the charm member in FIG. 7A has been rotated once around the axial center R2.

For example, when the charm member 3 rotates around an axial center R2 which is different from the axial center R1 and intersect with the axial center R1 by forming an internal angle of 45° as illustrated in FIG. 8A, the second annular part 31 and the ring member 4 interfere with each other, and in addition to that, the ring member 4 is twisted and interferes with the first annular part 14, as illustrated in FIG. 8B. As a result, the connecting part 5 as a whole gets entangled. Accordingly, the charm member 3 cannot rotate one or more turns around the axial center R2.

Figure 9A:
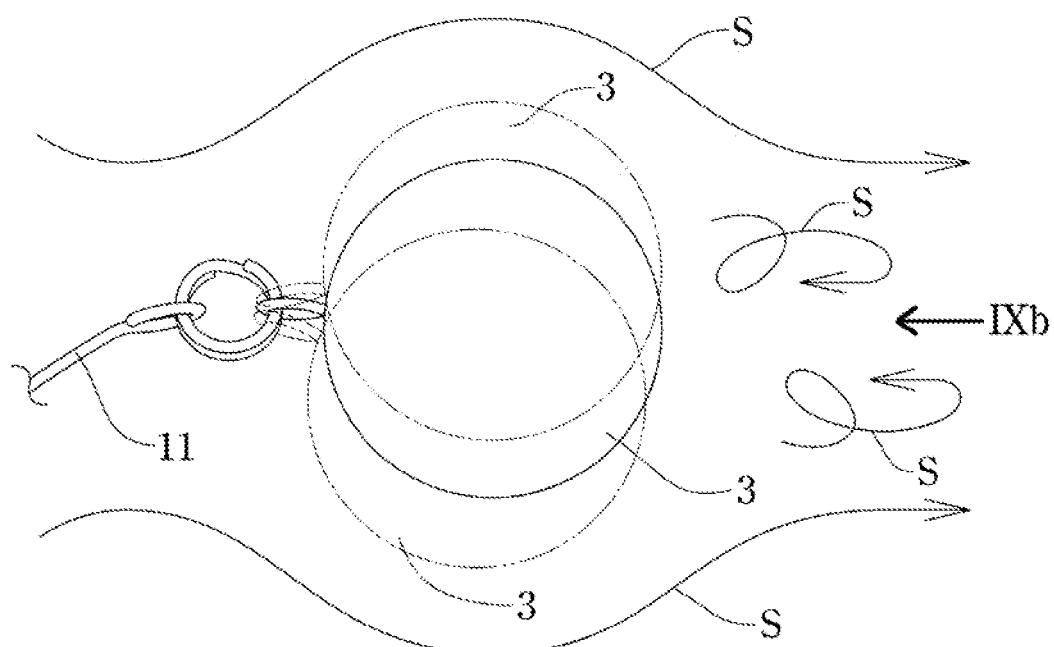
FIG. 9A is a partially enlarged side view of the charm member of the lure according to the first embodiment in a state of swaying.
Figure 9B:
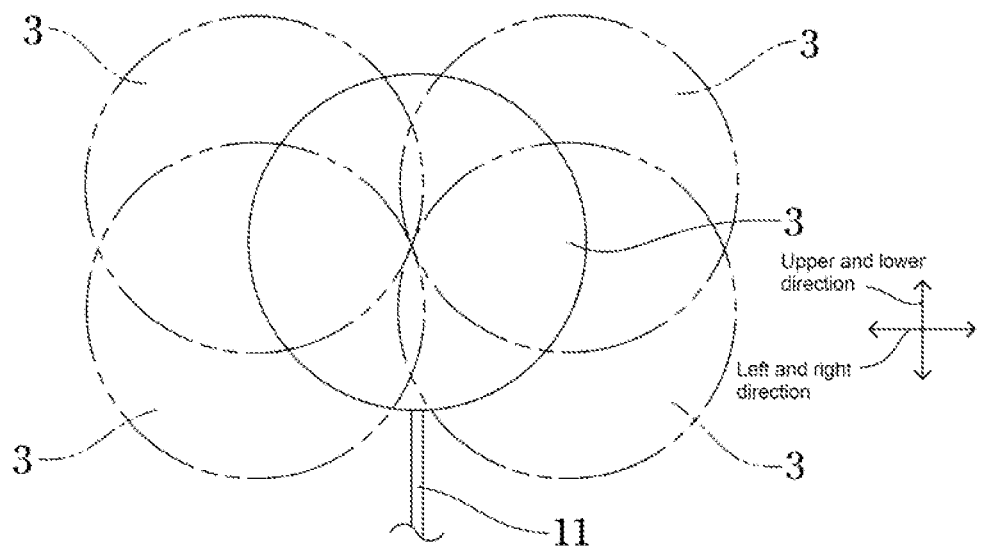
FIG. 9B is a rear view of FIG. 9A when viewed from a direction IXb.

As described above, when the charm member 3 does not rotate one turn around the axial center R1, it is considered that a water flow S flowing from the front to the back of the charm member 3 is likely to generate the above-described Karman's vortex street-like turbulent flow in a vicinity of the rear end of the charm member 3 as illustrated in FIG. 9A. As a result, the charm member 3 sways up and down and left and right randomly as illustrated in FIG. 9B.

An upper limit of a rotation angle of the charm member 3 (a possible rotation angle of the reference point X when the charm member 3 rotates around the axial center R1) is preferably 300° (⅚ turn), more preferably 270° (¾ turn), further preferably 240° (⅔ turn), particularly preferably 180° (½ turn). A lower limit of the rotation angle of the charm member 3 is usually 30° (1/12 turn), preferably 60° (⅙ turn), more preferably 90° (¼ turn), further preferably 120° (⅓ turn), particularly preferably 150° (5/12 turn).

According to the finding made by the present inventor, when the rotation angle of the charm member 3 is within the above range, the Karman's vortex street-like turbulent flow is likely to be generated in the vicinity of the rear end of the charm member 3, which easily allows the charm member 3 to sway randomly.

The above-described rotation angle of the charm member 3 is a possible angle when the charm member 3 is artificially rotated (specifically, when the charm member is rotated in any direction by holding the charm member). According to the finding made by the present inventor, when actually making the lure 10 of the present invention swim underwater, the charm member 3 sways up and down and left and right with a little rotation caused by a water flow.

As in this embodiment, when the first annular part 14 and the second annular part 31 are chain-like connected to each other via one ring member 4, the rotation angle of the charm member 3 can be set less than 360°. The rotation angle of the charm member 3 can be adjusted within the above range by changing an inside diameter of the first annular part 14, the second annular part 31, and the ring member 4. For example, in a case where an inside diameter of the first annular part 14 is rather larger than an inside diameter of the second annular part 31 (specifically, when the inside diameter of the first annular part 14 is 1.1 to 1.5 times larger than the inside diameter of the second annular part 31) as in this embodiment, if the inside diameter of the ring member 4 is made sufficiently larger than the inside diameter of the first annular part 14 and the second annular part 31 (for example, 1.2 times to 1.7 times larger than the inside diameter of the first annular part 14), the rotation angle of the charm member 3 is likely to be 30° to 270°. Further, although not particularly illustrated, if the inside diameter of the ring member 4 is made sufficiently smaller than the inside diameter of the first annular part 14 and the second annular part 31 (0.5 times to 0.8 times smaller than the inside diameter of the first annular part 14), the rotation angle of the charm member 3 is likely to be 30° to 150°.

The inside diameter of the first annular part 14 refers to a length of a straight line connecting a first dot on an inner edge of the first annular part 14 and a second dot, which is independent from the first dot, on the inner edge of the first annular part 14. It is assumed that such a straight line is countless. However, of all those straight lines, a straight line having the longest length corresponds to the inside diameter of the first annular part 14. The same can be said for the inside diameter of the second annular part 31 and the inside diameter of the ring member 4.

Figure 10A:
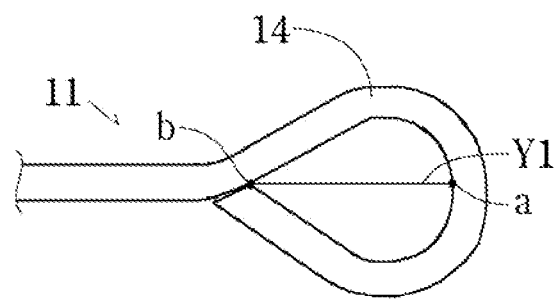
FIG. 10A is a partially enlarged top view of a first annular part of the lure according to the first embodiment.

As illustrated in FIG. 10A, in this embodiment, the first annular part 14 has an annular structure having a waterdrop-like shape when viewed from the top, and a length of a straight line Y1 connecting a first dot a on an inner edge positioned in a front end and a second dot b on an inner edge positioned in a rear end of the annular structure corresponds to the inside diameter of the first annular part 14.

Figure 10B:
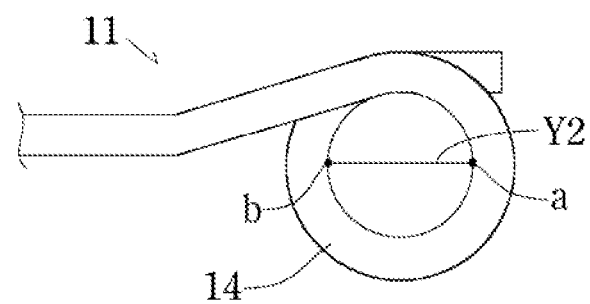
FIG. 10B is a partially enlarged top view of a modification example of the first annular part.

The annular structure of the first annular part 14 is not limited to a particular structure. For example, the annular structure can be made into a perfect circle as illustrated in FIG. 10B. In this case, a length of a straight line Y2 connecting a first dot a on an inner edge positioned in a front end of the annular structure and a second dot b on the inner edge positioned in a rear end of the annular structure corresponds to a diameter of the perfect circle. Additionally, although not illustrated, the inside diameter of the first annular part 14 when the annular structure is oval corresponds to a major axis of the oval, and when the annular structure is square, the inside diameter corresponds to a length of a diagonal line of the square.

According to the finding made by the present inventor, a ratio (1d/2d) of an inside diameter 1d of the first annular part 14 and an inside diameter 2d of the second annular part 31 is preferably 1.0 to 2.0, more preferably 1.0 to 1.5, further preferably 1.0 to 1.3. Further, a ratio (rd/1d) of an inside diameter 1d of the first annular part 14 and an inside diameter rd of the ring member 4 is preferably 1.0 to 3.0, more preferably 1.2 to 2.0, further preferably 1.5 to 2.0.

By setting the inside diameter of the first annular part 14, the second annular part 31, and the ring member 4 within the above range, the preferable rotation angle of the charm member 3 as described above can be easily achieved.

In this embodiment, although the connecting part 5 includes only one ring member 4 between the first annular part 14 and the second annular part 31, the connecting part 5 may include two or more ring members 4 (not illustrated). Even if the connecting part 5 includes two or more ring members, the rotation angle of the charm member 3 can be set within the above range by appropriately adjusting an inside diameter of the ring members.

However, too many ring members 4 results in poor yield of the lure 10. Thus, the number of the ring member 4 is preferably 1 to 4, more preferably 1 to 2, most preferably 1 as in this embodiment.

As illustrated in FIG. 1, a ratio (A/C) of the width A from the front end of the arm member 1 (the front end of the third arm part 13) to the rear end of the first annular part 14 and a width C from the rear end of the first annular part 14 to the rear end of the charm member 3 is preferably 0.8 or more.

Setting the ratio (A/C) of the width A and the width C as 0.8 or more can effectively prevent the entanglement of the charm member 3 and the fishing line when the lure 10 goes down the water.

Figure 11:
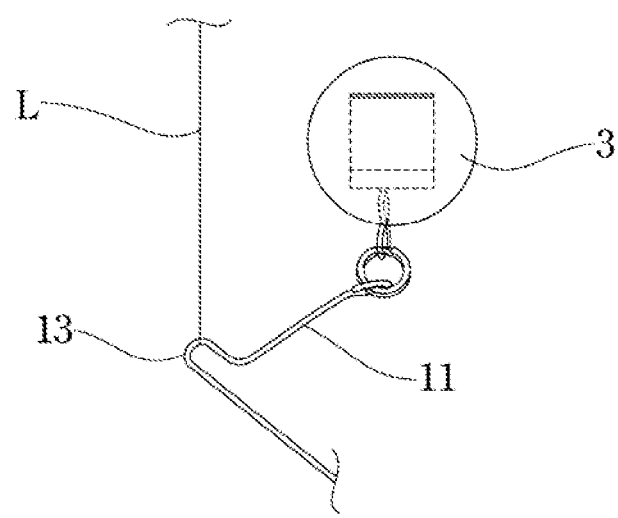
FIG. 11 is a partially omitted side view of the lure according to the first embodiment in a state of going down the water.

Specifically, when the lure 10 goes down the water, both the fishing line L tied to the third arm part 13 of the arm member 1 and the charm member 3 connected to the first arm part 11 are in a state where they extend in the upper direction as illustrated in FIG. 11. As the charm member 3 sways back and forth when going down, the charm member 3 may get entangled in the fishing line L if the charm member 3 and the fishing line L are too close to each other.

However, when the ratio (A/C) of the width A and the width C is 0.8 or more, the charm member 3 is sufficiently apart from the fishing line and thus hardly gets entangled in the fishing line even if the charm member 3 strongly sways forward when the lure 10 goes down. The ratio (A/C) of the width A and the width C is more preferably 1.0 or more, further preferably 1.2 or more. When the ratio (A/C) of the width A and the width C is 1.0 or more, the charm member 3 and the fishing line hardly come in contact with each other when the lure 10 goes down the water, thus effectively preventing the charm member 3 from getting entangled in the fishing line.

An upper limit of the ratio (A/C) of the width A and the width C is not limited to a particular ratio, and is usually 3.0, preferably 2.0. When the ratio (A/C) of the width A and the width C is more than 3.0, the swaying motion of the charm member 3 is not effectively propagated to the second arm part 12 when the lure 10 swims. As a result, the lure body 2 may not sway randomly.

A density (mass (g)/volume ($cm^3$)) of the charm member 3 is not limited to a particular density and is preferably less than 1.0 $g/cm^3$, more preferably less than 0.9 $g/cm^3$, further preferably less than 0.8 $g/cm^3$. As described below, when a hollow 32 is included inside the charm member 3, a volume of the charm member 3 means a volume including not only a volume of a formation material of the charm member 3 but also a volume of the hollow 32 inside the charm member 3.

When the density of the charm member 3 is less than 1.0 $g/cm^3$, the charm member 3 can float underwater, and thus, the arm member 1 and the lure body 2 connected to the charm member 3 can also float due to the buoyant force on the charm member 3. The conventional spinner bait has no buoyant force on its blade and thus easily falls over when it reaches the bottom of the water, which consequently causes a hook to be easily caught on something. In the present invention, on the other hand, as a result of setting the density of the charm member 3 as less than 1.0 $g/cm^3$, the lure 10 is less likely to fall over when the lure 10 reaches the bottom of the water, thereby preventing a hook from being easily caught on something.

A lower limit of the density of the charm member 3 is not limited to a particular value. However, when a weight of the charm member 3 is too light, it is difficult for the lure 10 to go down deep in the water. Thus, the lower limit is preferably 0.4 $g/cm^3$, preferably 0.5 $g/cm^3$, more preferably 0.6 $g/cm^3$.

To design the charm member 3 to have a density of less than 1.0 $g/cm^3$, forming the charm member 3 using a material having a density of less than 1.0 $g/cm^3$ or forming the hollow 32 inside the charm member 3, or performing both of the above are considered.

Examples of a formation material of the charm member 3 include wood, a synthetic resin, a rubber resin, and the like. The synthetic resin may be either a thermoplastic resin or a thermosetting resin.

Examples of the thermosetting resin include an epoxy resin; a polyester resin such as an alkyd resin; a vinyl ester resin; an imide resin; a bismaleimide resin; a thermosetting polyurethane resin; a thermosetting acrylic resin; and an amino resin such as an amide resin, a melamine resin, a urea resin, and a phenol resin. Examples of the thermoplastic resin include an olefin resin such as a propylene resin; a styrene resin such as an ABS resin; a thermoplastic acrylic resin; a thermoplastic polyurethane resin; and a vinyl resin. Examples of the rubber resin include a natural rubber, a styrene-butadiene rubber, an epoxidized natural rubber, a nitrile rubber, and an ethylene-propylene-diene rubber.

Even if the density of the formation material of the charm member 3 is 1.0 $g/cm^3$ or more, the density of the charm member 3 as a whole can be less than 1.0 $g/cm^3$ by providing a hollow inside the charm member 3. Examples of the formation material having a density of 1.0 $g/cm^3$ or more include an ABS resin having a density of around 1.1 $g/cm^3$ and polycarbonate having a density of around 1.2 $g/cm^3$.

As a method for forming the hollow 32 inside the charm member 3, a method in which two half-molded products each having a bowl-like shape are prepared using the above-described formation material and these two half-molded products are joined together with an adhesive is considered, for example. According to this method, a light reflective sheet 33 and a rattle 34 as described below can be easily enclosed inside the charm member 3.

When the charm member 3 includes the hollow 32 inside, the charm member 3 is preferably transparent. The aforementioned "the charm member 3 is transparent" means that it is so transparent that a shape of the hollow 32 can be seen through from outside the charm member 3. The charm member 3 may be colorless and transparent or may be colored and transparent.

When the charm member 3 is transparent, light transmittance of the charm member 3 is preferably 60% or more, more preferably 70% or more, particularly preferably 80% or more. When the light transmittance of the charm member 3 is 60% or more, the shape of the hollow 32 provided inside can be seen through well from outside the charm member 3.

In this case, the light transmittance refers to a value measured in accordance with JIS K 7105-1981 (Testing method for optical properties of plastics) and a value calculated by light transmittance (%)=(T2/T1)×100. T2 represents an amount of all beams of light (total amount of light transmitted through a test piece), and T1 represents an amount of incident light.

In this embodiment, the charm member 3 includes the hollow 32, and a light reflective sheet 33 is enclosed in this hollow 32. Enclosing the light reflective sheet 33 in the hollow 32 allows sunlight hitting on the charm member 3 to be reflected. As the charm member 3 sways up and down and left and right randomly, the sunlight hit on the charm member 3 is diffused randomly and sparkled, thus making the lure 10 look more like a real school of small fish. Although the light reflective sheet 33 can be attached on an outer surface of the charm member 3, the light reflective sheet 33 may come loose and fall from the charm member 3 in this case if the lure 10 is used over and over again. In this respect, if the light reflective sheet 33 is enclosed in the hollow 32, the light reflective sheet 33 is less likely to come loose and fall and the lure 10 can be stably used over a long period of time. Examples of the light reflective sheet 33 include a sheet on which a metallic foil such as aluminum is laminated, a hologram sheet on which light is reflected and separated into rainbow colors due to a prismatic effect, a reflective sheet colored with a fluorescent color, and the like. When a surface of the charm member 3 is coated with a metallic foil after enclosing the light reflective sheet 33 in the hollow 32, sunlight is easily diffused by the charm member 3.

In this embodiment, a transparent charm member 3 including the hollow 32 in which the light reflective sheet 33 is enclosed is used, and thus, the hollow 32, the light reflective sheet 33, and a part of the second annular part 31 provided inside can be visually identified from outside the charm member 3. In the drawings, a part of an outline of the hollow 32 provided inside the charm member 3 and the second annular part 31 are illustrated with a dashed line, and the light reflective sheet 33 is illustrated with a solid line and a grid-like pattern, for convenience. However, a part of the outline of the hollow 32 is illustrated with a solid line in FIG. 5A, and drawings of the hollow 32, the light reflective sheet 33, and the part of the second annular part 31 provided inside the charm member 3 are omitted in FIG. 7, FIG. 8, and FIG. 9, for understanding of the invention.

Although a shape of the hollow 32 is not limited to a particular shape, the hollow 32 preferably has a polyhedral structure. The polyhedral structure may be formed by a plane only, may be formed by a curved surface only, or may have both the plane and the curved surface.

Figure 5A:
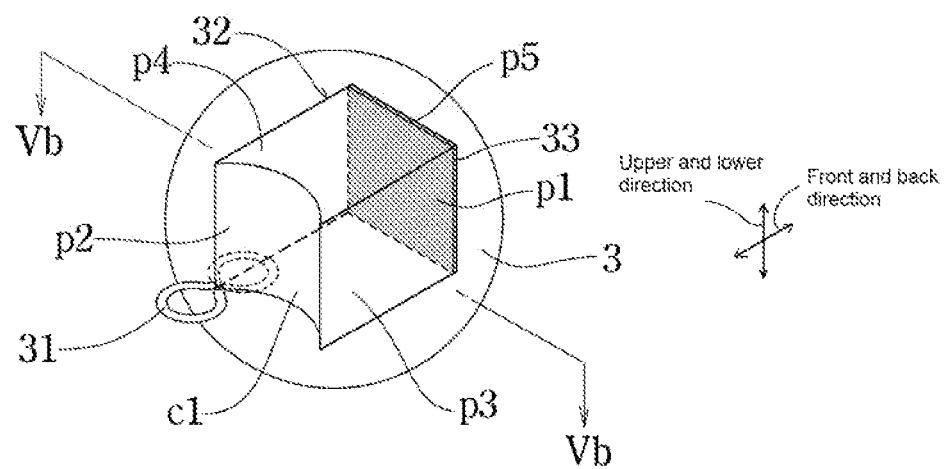
FIG. 5A is a perspective view of only the charm member and a second annular part of the lure in the first embodiment.
Figure 5B:
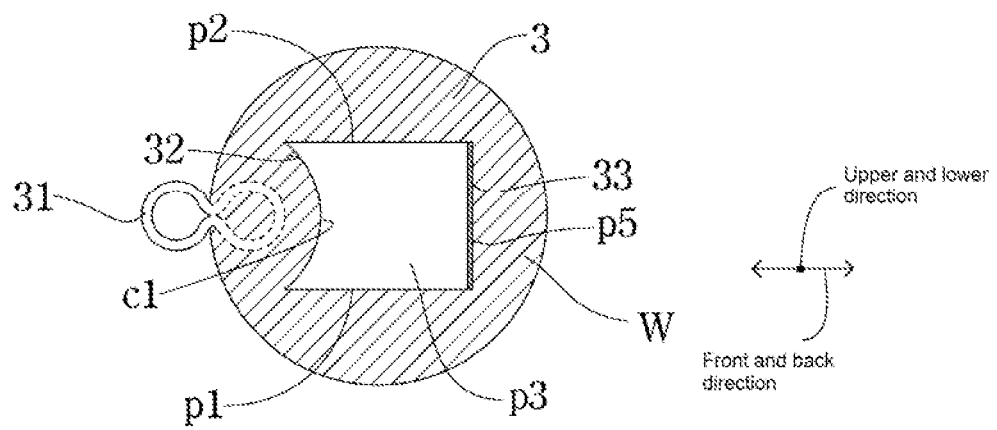
FIG. 5B is a cross-sectional view of FIG. 5A taken along a line Vb-Vb.

In this embodiment, as illustrated in FIGS. 5A and 5B, the charm member 3 includes the hollow 32 having a substantially rectangular parallelepiped shape inside the charm member 3. However, one of the faces of the rectangular parallelepiped shape (a face positioned foremost) has a curved surface with a center portion being curved rearward (a curved surface having a U shape when viewed from the top). That is, in this embodiment, the hollow 32 is formed by five planes (two planes p1, p2 extending parallel to the front and back direction and the upper and lower direction, two planes p3, p4 parallel to the front and back direction and orthogonal to the upper and lower direction, and one plane p5 extending orthogonal to the front and back direction and parallel to the upper and lower direction) and one curved surface c1.

As described above, when the polyhedral structure has a plane, a wall W defined by the outer surface of the charm member 3 and the hollow 32 provided inside the charm member 3 has a convex lens-like shape. As a result, the light reflective sheet 33 enclosed inside the charm member 3 looks large when viewed from outside the charm member 3.

For example, in this embodiment, among the five planes of the polyhedral structure, the light reflective sheet 33 is attached on the plane p5. The outer surface of the charm member 3 corresponding to the plane p5 has a curved surface which is curved rearward. Accordingly, as illustrated in FIG. 5B, the wall W of the charm member 3 defined by the plane p5 and the outer surface of the charm member 3 corresponding to the plane p5 has a plano-convex lens-like shape. Thus, the light reflective sheet 33 provided inside the charm member 3 looks large when the charm member 3 is observed from a rear side, thereby effectively attracting the target fish.

Although not particularly illustrated, the light reflective sheet 33 can be attached not only on the plane p5 but also on the planes p1 to p4. When the light reflective sheet 33 is attached on the planes p1, p2, the light reflective sheet 33 also looks large when the charm member 3 is viewed from a lateral side. Additionally, when the light reflective sheet 33 is attached on the planes p2, p3, the light reflective sheet 33 looks large when the charm member 3 is viewed from the top and bottom. Although the light reflective sheet 33 is attached throughout the plane p5 in this embodiment, the light reflective sheet 33 may be attached on a part of the plane p5 (the same can be said for planes p1 to p4).

Considering a magnification effect of the light reflective sheet 33, the polyhedral structure of the hollow 32 preferably has a plane, and is more preferably formed by a plane only. The number of faces forming the polyhedral structure of the hollow 32 is not limited to the particular number, and is usually 3 faces to 10 faces, preferably 3 faces to 8 faces, more preferably 3 faces to 6 faces. Examples of the polyhedral structure having such number of faces include a cubic structure, a rectangular parallelepiped structure, a regular tetrahedral structure, and the like.

As described above, in the lure 10 of the present invention, the charm member 3 having a substantially spherical shape is rotatable around the axial center R1 and allows a rotation amount of the charm member 3 to be regulated within a predetermined range. Accordingly, the charm member 3 sways up and down and left and right randomly while swimming, and vibrations produced by this swaying motion are propagated to the lure body 2 via the arm member 1. As a result, the lure body 2 sways randomly. Therefore, as the lure 10 of the present invention has an appearance like a randomly moving real school of small fish, it is difficult for the target fish to find out that the lure of the present invention is not an real bait and an excellent catch can be expected over a long period of time even if the lure is used over a long period of time.

In the conventional spinner bait, a blade that rotates continuously is used while swimming, and this blade may get entangled in a seaweed in the water. On the other hand, the charm member 3 of the present invention rotates less than 1 turn only and hardly gets entangled in a seaweed, and thus, an excellent catch can be expected over a long period of time.

Second Embodiment

Figure 12:
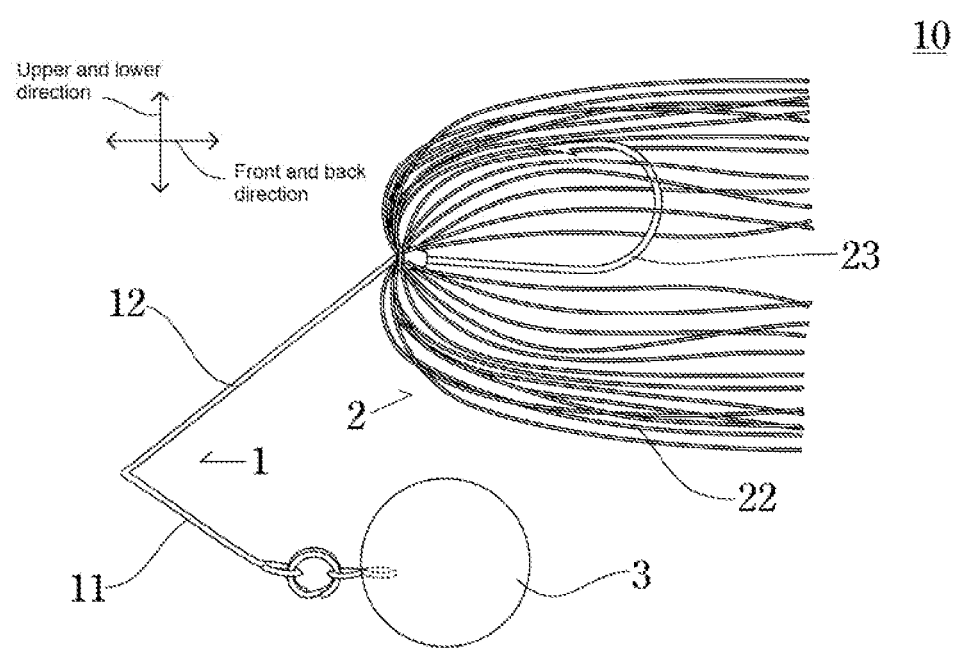
FIG. 12 is a side view of a lure according to a second embodiment of the present invention.

In the first embodiment, the first arm part 11 of the arm member 1 extends upward from the second arm part 12. In this embodiment, on the other hand, the first arm part 11 of the arm member 1 extends downward from the second arm part 12 as illustrated in FIG. 12. While an end of the first arm part 11 and an end of the second arm part 12 included in the arm member 1 in the first embodiment are connected to each other via the third arm part 13 having a U shape, the end of the first arm part 11 and the end of the second arm part 12 in this embodiment are directly connected to each other without the third arm part. While the lure body 2 in the first embodiment includes the main part 21, the skirt 22, and the fish hook 23, the lure body 2 in this embodiment does not include the main part 21 and is formed by the skirt 22 and the fish hook 23 only. Further, while the hollow 32 is provided inside the charm member 3 in the first embodiment, the charm member 3 in this embodiment does not include the hollow 32 and the density of the charm member 3 is 1.0 g/cm$^3$ or more (that is, in this embodiment, the charm member 3 also functions as a sinker).

Even if such a lure 10 is used, the charm member 3 sways up and down and left and right randomly based on the same principle as in the first embodiment, thereby effectively attracting the target fish. However, as the target fish has a habit of biting the lure body 2 generally from the rear side and a lower side of the lure 10, the charm member 3 is preferably provided above the lure body 2 as in the first embodiment.

In this embodiment, the fishing line tied to the border between the first arm part 11 and the second arm part 12 may be moved to the second arm part 12 while the lure 10 swims. Given the above, the arm member 1 preferably has a third arm part 13 as in the first embodiment.

Third Embodiment

Although the light reflective sheet 33 is attached on the plane forming the polyhedral structure in the first embodiment, the light reflective sheet 33 may not be necessarily attached on the plane and may be provided so as to divide the hollow 32 of the charm member 3.

Figure 13A:
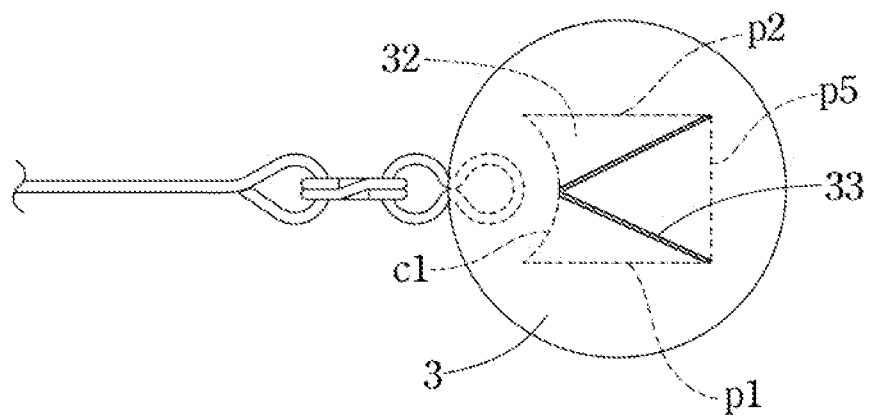
FIGS. 13A and 13B are a partially enlarged top view of a charm member and its surrounding members included in a lure according to a third embodiment of the present invention.
Figure 13B:
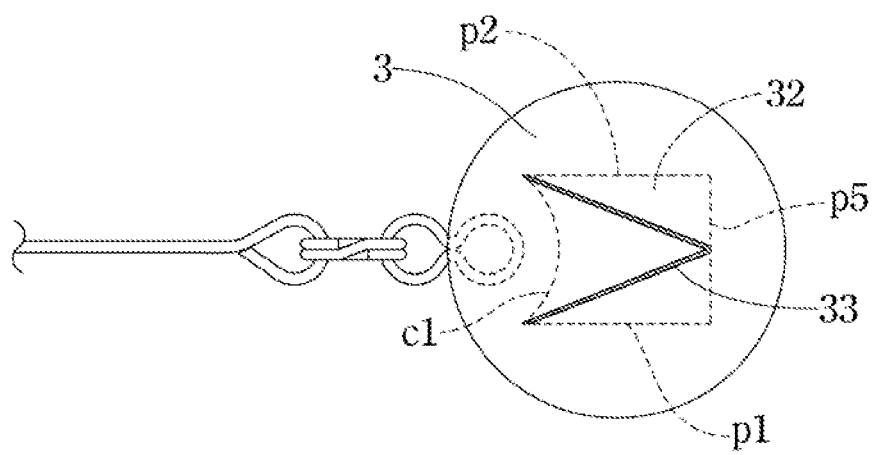

For example, as illustrated in FIG. 13B, the light reflective sheet 33 bended into a substantially V shape when viewed from the top is enclosed so as to divide the hollow 32 of the charm member 3 in three sections in this embodiment. In FIG. 13A, one end of the light reflective sheet 33 is positioned on the border between the plane p5 and the plane p1, the other end of the light reflective sheet 33 is positioned on the border between the plane p5 and the plane p2, and the light reflective sheet 33 is provided so that a bended part of the light reflective sheet 33 comes in contact with a rear end of the curved surface c1. In FIG. 13B, one end of the light reflective sheet 33 is positioned on a border between the plane p1 and the curved surface c1, the other end of the light reflective sheet 33 is positioned on the border between the plane p2 and the curved surface c1, the light reflective sheet 33 is positioned so that the bended part of the light reflective sheet 33 comes in contact with a center portion of the plane p5. Although not illustrated, the light reflective sheet 33 can be enclosed in the hollow 32 by bending the light reflective sheet 33 into a substantially W shape when viewed from the top or a substantially U shape when viewed from the top. The appearance of the charm member 3 greatly changes according to a shape or a position of the light reflective sheet 33.

As described above, dividing the hollow 32 with the light reflective sheet 33 not only allows the appearance of the charm member 3 to colorfully change according to an angle from which it is viewed but also allows light to be easily diffused more randomly when the charm member 3 sways. Accordingly, it is possible to make the appearance of the lure 10 look more like a randomly moving real school of small fish and also attract the target fish more effectively.

Fourth Embodiment

Figure 14A:
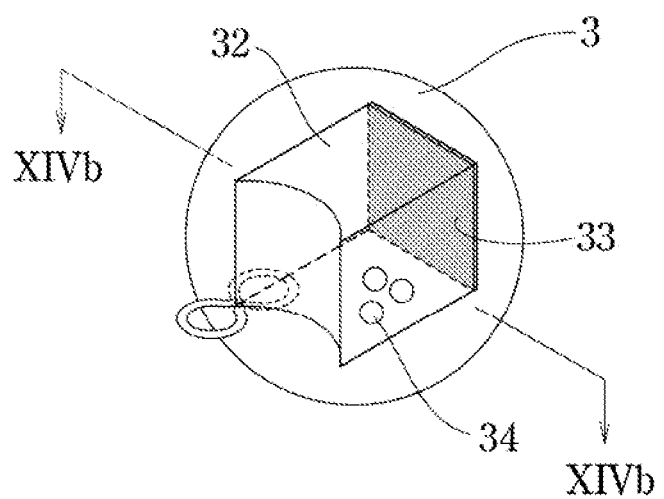
FIG. 14A is a perspective view of only a second annular part and a charm member included in a lure according to a fourth embodiment of the present invention.
Figure 14B:
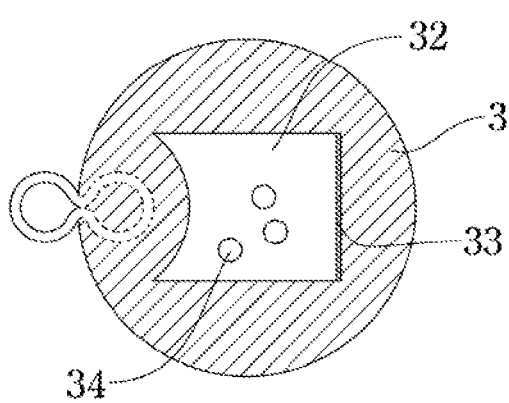
FIG. 14B is a cross-sectional view of FIG. 14A taken along a line XIVb-XIVb.

In the first embodiment, the light reflective sheet 33 is enclosed in the hollow 32 of the charm member 3. However, as illustrated in FIGS. 14A and 14B, the light reflective sheet 33 can be enclosed in the hollow 32 of the charm member 3 together with a rattle 34 (or a rattle 34 can be enclosed in the hollow 32 of the charm member 3 in place with the light reflective sheet 33).

The rattle 34 is a granular material bouncing inside the hollow 32 when the charm member 3 sways. As a result of having the rattles 34 bouncing inside the hollow 32, the rattles 34 collide with each other or collide with a plane forming the hollow 32, thus making a so-called rattling sound. With the rattling sound made by the charm member 3, the lure 10 can effectively attract the target fish swimming far away from the lure 10.

Although a shape of the rattle 34 is not limited to a particular shape, a substantially spherical shape and a polyhedral shape such as a substantially cubic shape, a substantially rectangular parallelepiped shape, and a substantially cylindrical shape can be employed. The number of the rattle 34 is not limited to the particular number, and can be appropriately set in consideration of a volume of the hollow 32. The number of the rattle 34 is usually 1 to 10, preferably 2 to 5, more preferably 2 to 3. As illustrated in FIGS. 14A and 14B, three rattles 34 each having a substantially perfect spherical shape are enclosed in the hollow 32 in this embodiment.

According to the finding made by the present inventor, the sound made by the rattle 34 colliding with the plane is likely to be louder than the sound made by the rattle 34 colliding with the curved surface, and thus easily attracts the target fish swimming further away. For that reason, in view of making the rattling sound, the polyhedral structure of the hollow 32 included in the charm member 3 preferably has a plane, and, more preferably, is formed by the plane only.

A formation material of the rattle 34 is not limited to a particular material, and a metal such as iron, lead, tungsten, aluminum, and an alloy of these metals, a glass, or a synthetic resin can be used, for example. A synthetic resin is preferably used in terms of reducing weight of the charm member 3, and a metal is preferably used in terms of making a big rattling sound.

When two or more rattles 34 are enclosed in the hollow 32, a formation material and a size of each rattle 34 may be the same or different from each other. Using rattles 34 each having a different formation material and size allows the rattles 34 to make various sounds. When the hollow 32 is divided with the light reflective sheet 33 as described in the third embodiment, one or more rattles 34 can be enclosed in every section of the hollow 32.

Fifth Embodiment

Figure 15:
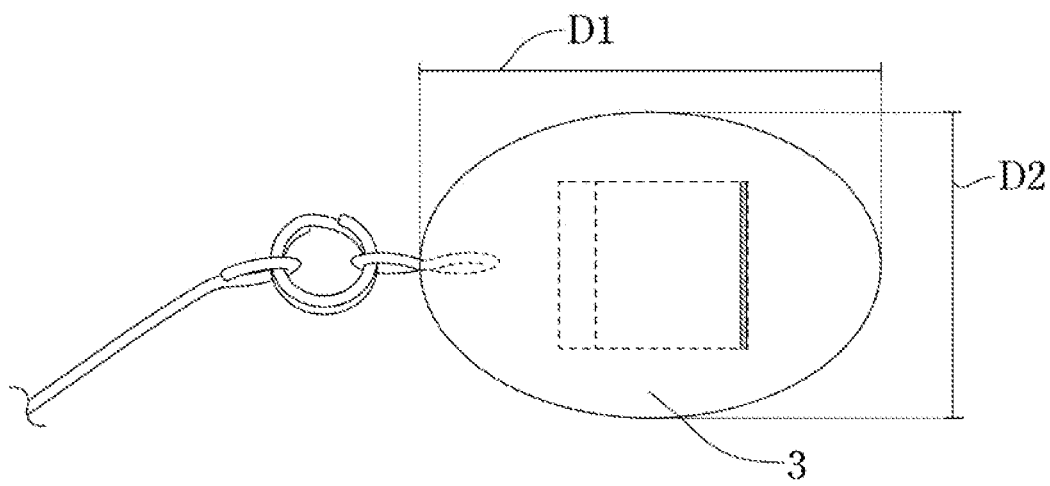
FIG. 15 is a partially enlarged side view of a charm member and its surrounding members included in a lure according to a fifth embodiment of the present invention.

In the first embodiment, the charm member 3 having a substantially perfect spherical shape is used. In this embodiment, on the other hand, the charm member 3 having a substantially oval spherical shape is used as illustrated in FIG. 15. Even if the charm member 3 having such a substantially oval spherical shape is used, a Karman's vortex street-like turbulent flow is generated in a vicinity of the rear end of the charm member 3, which allows the charm member 3 to sway randomly.

When the charm member 3 having a substantially oval spherical shape is used, a ratio (D1/D2) of a length D1 of a major axis and a length D2 of a minor axis of the oval sphere is preferably 1.5 to 3.0, more preferably 1.5 to 2.0. When the ratio is more than 3.0, the oval sphere is too flat to generate the Karman's vortex street-like turbulent flow effectively.

In the first embodiment, as the charm member 3 having a substantially perfect spherical shape is used, a distinction cannot be made between a major axis and a minor axis. However, if the ratio (D1/D2) of the major axis and the minor axis is daringly calculated, it is approximately 1.0 (0.9 to 1.1).

Sixth Embodiment

In the first embodiment, a charm member 3 having a substantially perfect spherical shape is used. However, according to an extensive study made by the present inventor, the charm member 3 is likely to sway more randomly by providing a cutout surface 35 on the charm member 3.

Figure 16A:
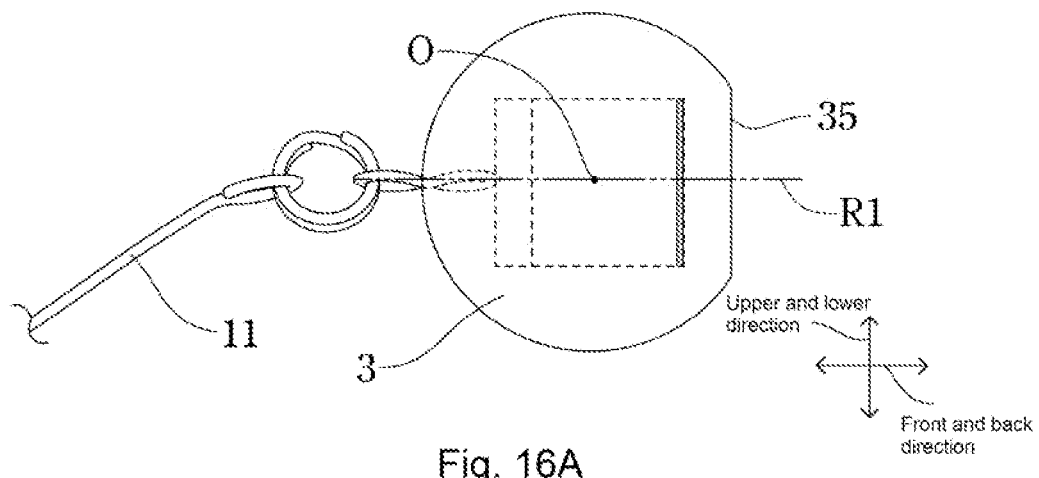
FIG. 16A is a partially omitted enlarged side view of a charm member and its surrounding members included in a lure according to a sixth embodiment of the present invention.
Figure 16B:
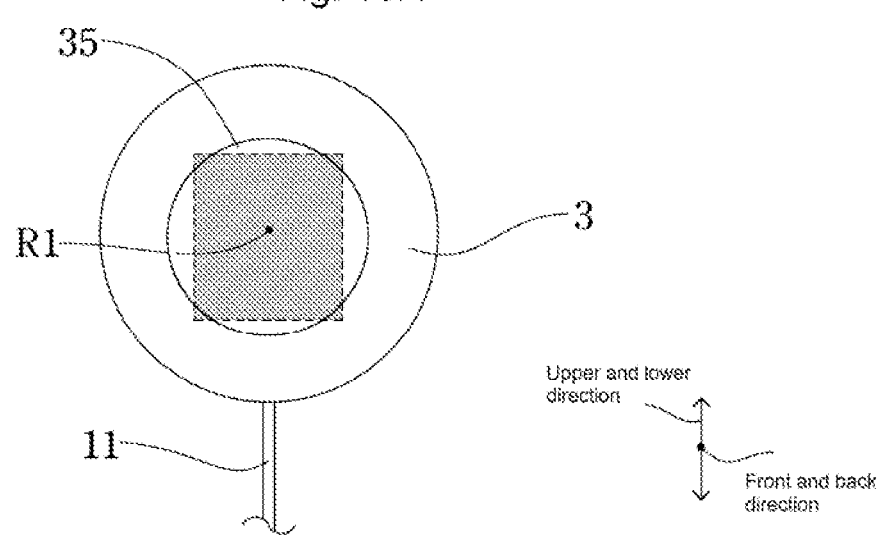
FIG. 16B is a rear view of FIG. 16A.

For example, as illustrated in FIGS. 16A and 16B, the cutout surface 35 having a plane shape is provided in the rear end of the charm member 3 in this embodiment. This cutout surface 35 may be provided substantially orthogonally to the axial center R1 of the charm member 3, or may be provided to form a predetermined angle with the axial center R1 (not illustrated). However, according to the finding made by the present inventor, providing the cutout surface 35 substantially orthogonally to the axial center R1 allows the charm member 3 to be most likely to sway randomly. The term "substantially orthogonally" means that an angle formed by the cutout surface 35 and the axial center R1 includes an angle ranging from 87° to 93°.

As illustrated in FIG. 16B, a shape of the cutout surface 35 when viewed from the rear side is a perfect circle in this embodiment. Although the shape of the cutout surface 35 when viewed from the rear side is not limited to a particular shape, a polygon such as a square and a hexagon, a circle such as a perfect circle and an oval, and an indefinite shape can be used. According to the finding made by the present inventor, the shape of the cutout surface 35 when viewed from the rear side is preferably a circle, more preferably a perfect circle or an oval, particularly preferably a perfect circle, in terms of easily making the charm member 3 sway randomly. The circle includes not only a perfect circle but also an oval and an indefinite shape thereof (a shape that is acknowledged as roughly a circle).

According to the finding made by the present inventor, a surface area of the cutout surface 35 with respect to a surface area of the charm member 3 is preferably 5% to 20%, more preferably 5% to 15%, further preferably 8% to 15%. When the area of the cutout surface 35 is within the above range, the charm member 3 is likely to sway more randomly.

It is not clear why the charm member 3 is likely to sway more randomly by providing such a cutout surface 35 in the rear end of the charm member 3. However, based on a presumption of the present inventor, it is considered that the above-described Karman's vortex street-like turbulent flow is easily generated by providing the cutout surface 35 or the charm member 3 is easily affected by the Karman's vortex street-like turbulent flow.

Although not particularly illustrated, a cutout surface 35 having a shape other than a plane can also be employed in this embodiment. For example, a curved surface curving inward of the charm member 3 can be used as the cutout surface 35 (not illustrated).

Seventh Embodiment

Figure 17:
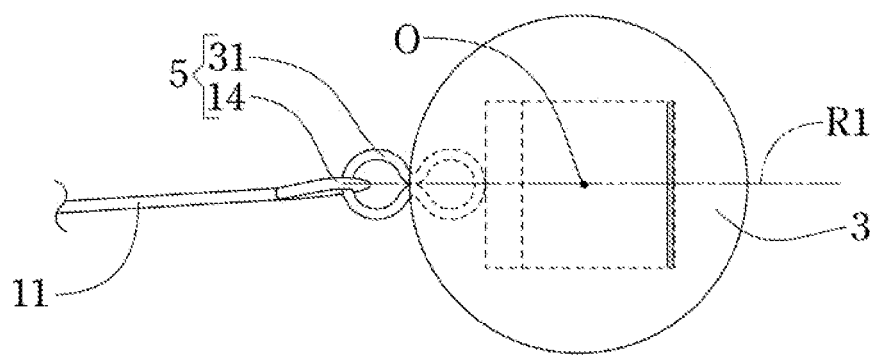
FIG. 17 is a partially enlarged side view of a charm member and its surrounding members included in a lure according to a seventh embodiment of the present invention.

In the first embodiment, the connecting part 5 includes the first annular part 14 included in the first arm part 11, one ring member 4, and the second annular part 31 included in the charm member 3. In this embodiment, on the other hand, the connecting part 5 does not include the ring member 4 and only includes the first annular part 14 and the second annular part 31 as illustrated in FIG. 17. In this case, the first annular part 14 and the second annular part 31 are connected to each other in a state where the second annular part 31 is inserted through a hole of the first annular part 14. In other words, it is in a state where the first annular part 14 is inserted through a hole of the second annular part 31. That is, the first annular part 14 and the second annular part 31 are connected to each other without the ring member 4. Even if the first annular part 14 and the second annular part 31 are connected to each other in this way, the charm member 3 is rotatable around an axial center R1 connecting the connecting part 5 and a center O of the charm member 3 and allows the rotation amount of the charm member 3 to be regulated within a predetermined range.

When the first annular part 14 and the second annular part 31 are directly connected to each other, the rotation angle of the charm member 3 can be adjusted by appropriately changing an inside diameter of the first annular part 14 and the second annular part 31. A possible rotation angle of the charm member 3 in this embodiment is preferably within the same range as those exemplified in the first embodiment. Setting the possible rotation angle of the charm member 3 within such a range allows a Karman's vortex street-like turbulent flow to be easily generated in a vicinity of the rear end of the charm member 3 and easily allows the charm member 3 to sway more randomly.

Eighth Embodiment

In the first embodiment, the second annular part 31 is formed by implanting one of two annular parts of a wire rod which is shaped by bending the wire rod into an 8 shape. For that reason, the annular structure of the second annular part 31 is formed by a wire rod only. However, the annular structure of the second annular part 31 may not be formed by the wire rod only and may be formed by the wire rod and the charm member 3 or the formation material of the charm member 3 only.

Figure 18A:
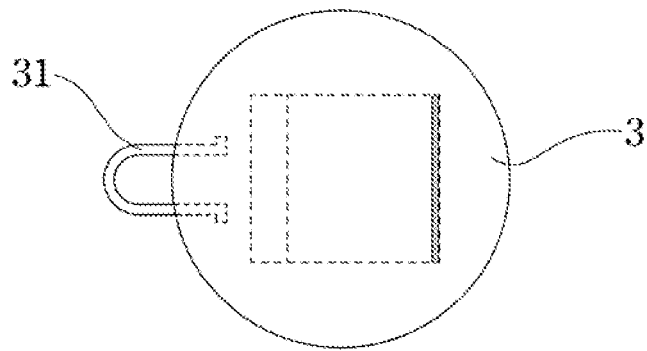
FIGS. 18A and 18B are an enlarged side view of only a charm member and a second annular part included in a lure according to an eighth embodiment of the present invention.

For example, as illustrated in FIG. 18A, the second annular part 31 may be formed by implanting one end and the other end of the wire rod bended into a U shape in the charm member 3. In this case, the annular structure of the second annular part 31 is formed by the wire rod and an outer surface of the charm member 3.

Figure 18B:
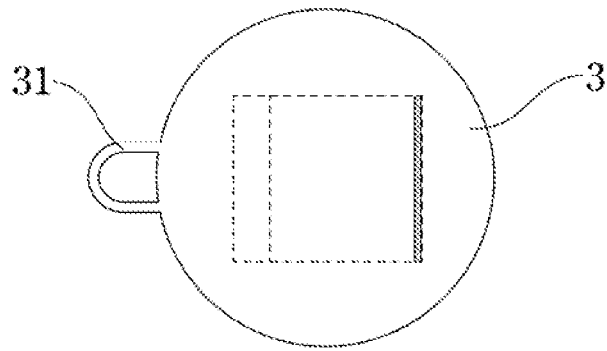

As illustrated in FIG. 18B, the second annular part 31 may be formed by providing a protrusion having a U shape which is protruded from a part of the outer surface of the charm member 3. In this case, the annular structure of the second annular part 31 is formed by the formation material of the charm member 3 only.

As in this embodiment, even if the second annular part 31 having an annular structure, which is not formed by a wire rod only, is used, the rotation angle of the charm member 3 can be made less than 360° by directly connecting the first annular part 14 and the second annular part 31 or chain-like connecting them via one ring member 4.

Ninth Embodiment

Figure 19:
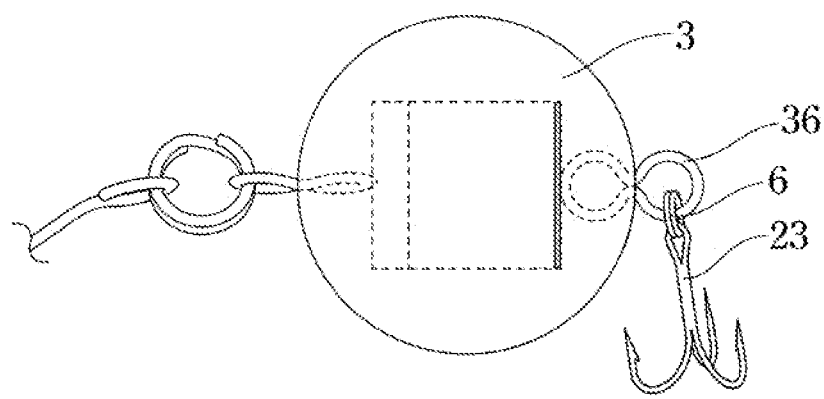
FIG. 19 is a partially omitted enlarged side view of a charm member and its surrounding members included in a lure according to a ninth embodiment of the present invention.
Figure 20A:
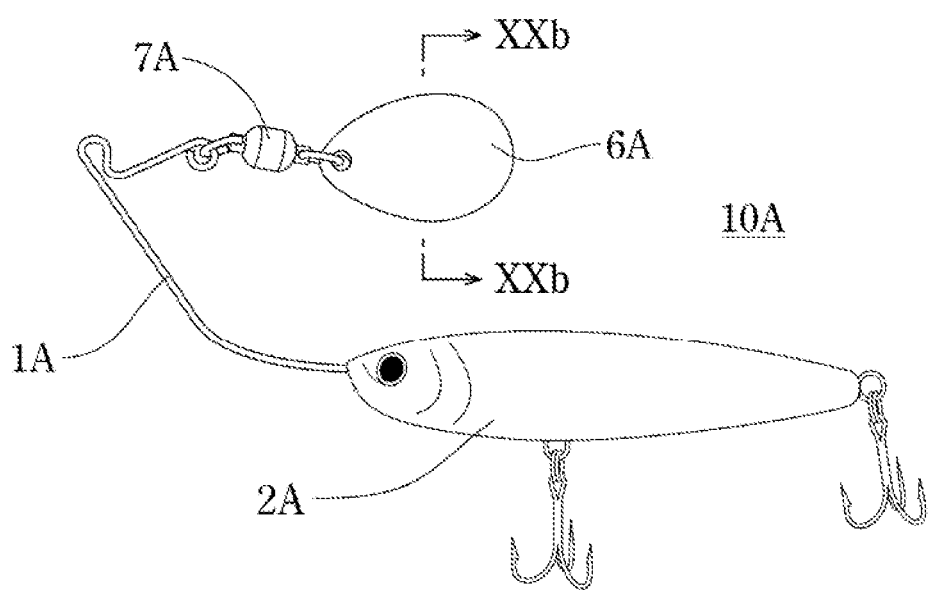
FIG. 20A is a side view of a conventional spinner bait.
Figure 20B:
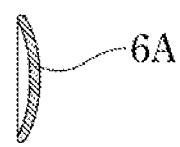
FIG. 20B is a cross-sectional view of FIG. 20A taken along a line XXb-XXb.

In this embodiment, as illustrated in FIG. 19, a fish hook 23 is connected to the rear end of the charm member 3. Specifically, the fish hook 23 is connected to the rear end of the charm member 3 via a third annular part 36 implanted in the rear end of the charm member 3 and an interposing ring 6 inserted through the third annular part 36. As described above, by connecting the fish hook 23 to the rear end of the charm member 3 the target fish can be caught even if the target fish bites the charm member 3 instead of the lure body 2.

A configuration of the lure 10 of the present invention is not limited to a specific configuration as described in the first to ninth embodiments, and design changes can be appropriately made within the intended scope of the present invention by combining the configurations of each embodiment.

For example, the charm member 3 having a substantially oval spherical shape described in the fifth embodiment may be provided with the cutout surface 35 of the sixth embodiment or the hollow 32 and the light reflective sheet 33 of the first embodiment. Further, the light reflective sheet 33 can be removed from the charm member 3 described in the first embodiment.

REFERENCE SIGNS LIST

10 Lure
1 Arm member
11 First arm part
12 Second arm part
13 Third arm part
14 First annular part
2 Lure body
21 Main part
22 Skirt
23 Fish hook
3 Charm member
31 Second annular part
32 Hollow
33 Light reflective sheet
34 Rattle
35 Cutout surface
4 Ring member
5 Connecting part
R1, R2 Axial center

The invention claimed is:

1. A lure comprising:
an arm member including a first arm part having an elongated shape, and a second arm part connected to an end part of the first arm part and extending in a direction not parallel to the first arm part; and
a charm member connected to the first arm part via a connecting part,
wherein
the charm member is substantially spherical, and
the charm member is connected to the first arm part to be rotatable around an axial center connecting the connecting part and a center of the charm member and to allow a rotation amount of the charm member to be regulated within a predetermined range.

2. The lure according to claim 1, wherein
the connecting part includes a first annular part provided to the first arm part and a second annular part provided to the charm member, and
the first annular part and the second annular part are connected to each other in a state where the second annular part is inserted through a hole of the first annular part.

3. The lure according to claim 1, wherein
the connecting part includes a first annular part provided to the first arm part, a second annular part provided to the charm member, and at least one ring member, and
the first annular part and the ring member are connected to each other in a state where the ring member is inserted through a hole of the first annular part and the second annular part and the ring member are connected to each other in a state where the ring member is inserted through a hole of the second annular part.

4. The lure according to claim 1, wherein a cutout surface is formed on the charm member.

5. The lure according to claim 4, wherein the cutout surface is a plane substantially orthogonal to an axial center of the charm member.

6. The lure according to claim 4, wherein a percentage of a surface area of the cutout surface with respect to a surface area of the charm member is 5% to 20%.

7. The lure according to claim 1, wherein a density of the charm member is less than 1.0 g/cm$^3$.

8. The lure according to claim 1, wherein a hollow having a polyhedral structure is formed inside the charm member.

9. The lure according to claim 2, wherein a cutout surface is formed on the charm member.

10. The lure according to claim 3, wherein a cutout surface is formed on the charm member.

11. The lure according to claim 5, wherein a percentage of a surface area of the cutout surface with respect to a surface area of the charm member is 5% to 20%.

12. The lure according to claim 2, wherein a density of the charm member is less than 1.0 g/cm$^3$.

13. The lure according to claim 3, wherein a density of the charm member is less than 1.0 g/cm$^3$.

14. The lure according to claim 2, wherein a hollow having a polyhedral structure is formed inside the charm member.

15. The lure according to claim 3, wherein a hollow having a polyhedral structure is formed inside the charm member.

* * * * *